United States Patent
Evans et al.

(10) Patent No.: US 7,880,334 B2
(45) Date of Patent: Feb. 1, 2011

(54) POWER SUPPLY CONTROL FOR POWER GENERATOR

(75) Inventors: Christopher John Evans, Brighton (GB); Charles Richard Elliott, Pudsey (GB); Stephen James Watkins, Leeds (GB)

(73) Assignee: Ceres Intellectual Property Company, Limited, West Sussex (GB)

( * ) Notice: Subject to any disclaimer, the term of this patent is extended or adjusted under 35 U.S.C. 154(b) by 189 days.

(21) Appl. No.: 11/833,791

(22) Filed: Aug. 3, 2007

(65) Prior Publication Data

US 2008/0067869 A1 Mar. 20, 2008

Related U.S. Application Data

(60) Provisional application No. 60/854,081, filed on Oct. 25, 2006.

(30) Foreign Application Priority Data

Aug. 4, 2006 (GB) ................................. 0615562.6

(51) Int. Cl.
*H02J 7/00* (2006.01)
*H02J 9/00* (2006.01)
(52) U.S. Cl. ........................................................ 307/66
(58) Field of Classification Search ................... 307/66, 307/11, 18
See application file for complete search history.

(56) References Cited

U.S. PATENT DOCUMENTS

| 6,452,289 | B1 | 9/2002 | Lansberry et al. | |
|---|---|---|---|---|
| 6,847,127 | B1 | 1/2005 | Lee | |
| 6,940,735 | B2 | 9/2005 | Deng et al. | |
| 6,951,110 | B2 | 10/2005 | Kang | |
| 2002/0036430 | A1* | 3/2002 | Welches et al. | ............... 307/18 |
| 2002/0047309 | A1 | 4/2002 | Droppo et al. | |
| 2002/0109406 | A1 | 8/2002 | Aberle et al. | |
| 2004/0062059 | A1 | 4/2004 | Cheng et al. | |
| 2005/0162018 | A1 | 7/2005 | Realmuto et al. | |
| 2006/0034106 | A1 | 2/2006 | Johnson | |
| 2006/0092588 | A1 | 5/2006 | Realmuto et al. | |
| 2006/0188763 | A1* | 8/2006 | Bai et al. | ....................... 429/22 |

FOREIGN PATENT DOCUMENTS

| EP | 1 376 837 A1 | 1/2004 |
|---|---|---|
| WO | WO 02/21659 A | 3/2002 |
| WO | WO 2005/036684 A2 | 4/2005 |

\* cited by examiner

*Primary Examiner*—Jared J Fureman
*Assistant Examiner*—Carlos Amaya
(74) *Attorney, Agent, or Firm*—Miles & Stockbridge P.C.

(57) ABSTRACT

A system (100) for connecting a fuel cell stack to an A.C. grid to provide power thereto is disclosed in which a voltage regulated D.C. bus (110) is provided to be coupled to the fuel cell stack, a bidirectional inverter (120) is coupled to the D.C. bus (110), and is to be coupled between the D.C. bus (110) and the A.C. grid. At least one D.C. auxiliary load (130) of the fuel cell stack is provided coupled to the D.C. bus (110). A D.C. to D.C. converter (140) is provided between the fuel cell stack and the D.C. bus (110).

36 Claims, 6 Drawing Sheets

POWER SUPPLY CONTROL FOR POWER GENERATOR

CROSS-REFERENCE TO RELATED APPLICATION

This application claims the benefit of U.S. Provisional Application No. 60/854,081 filed Oct. 25, 2006.

The present invention relates to power generation. In particular, the present invention relates to systems for controlling the connection of a fuel cell stack and an A.C. grid.

BACKGROUND OF THE INVENTION

Fuel cells can be a useful, efficient and environmentally friendly solution to power generation. They have few moving parts, and are highly efficient at converting energy contained in the fuel into usable electricity, and, in some cases, useable heat. Fuel cells generate direct current (D.C.). Generally, a fuel cell will generate D.C. at a voltage in the order of 1V, and, when operating under load, between 0.3V and 0.8V. The voltage changes, depending on the operating parameters of the fuel cells and the load drawn.

In general, the power from one fuel cell is insufficient to satisfy the electrical load requirements of the applications that fuel cells are provided for. Thus multiple fuel cells are connected together to form a fuel cell stack, with the preference to electrically connect the fuel cells in a series arrangement. A fuel cell stack includes additional items, including air and fuel manifolding and means of getting the electrical power out from the fuel cell stack.

A fuel cell system will incorporate at least one such fuel cell stack, as well as the fuel and air handling components (such as a blower, valves and filters), a control system, and the power electronics to allow the electrical power of the fuel cell to be converted to correct form to power the electrical load or loads to which it is connected. Such electrical loads could be direct current loads (DC loads) or alternating current loads (AC loads). Examples of such loads include batteries, pumps and blowers, motors, local mains, local grids and the national grid.

Fuel cells stacks can be used to provide electricity to an Alternating Current (A.C.) "grid" (such as the national grid in the UK). Alternative "grids" may include generators or stand-alone inverters connected to a D.C. source, in fact any A.C. system. Such fuel cell systems, when connected to the grid, provide a distributed network of power generation, and are particularly useful to provide extra power to a grid at times of peak power demand, when the grid is under heavy load. Due to their nature of operation, requiring fuel and air to be provided to the fuel cell under the right conditions of temperature, and in some cases pressure, fuel cell systems do not instantaneously start and stop generating electricity. Instead, they have "ramp up" and "ramp down" periods, between being completely off and at their operating capacity. Further, fuel cell systems require auxiliary devices, which enable the operation of the fuel cell stacks. Examples of such auxiliary devices are air blowers, which keep the operating temperature at the correct levels, and fuel pumps, which provide the fuel to the fuel cell stacks to enable them to generate power et cetera. Because the fuel cell stack generates D.C. voltage, and the grid requires A.C. voltage, conversion of the D.C. power is required by the fuel cell system when providing power to a grid. Because of the ramp time of a fuel cell stack, there are times when the auxiliary loads must be powered from the grid, so that they are always provided with operating power, even when the fuel cell stack is not providing power.

SUMMARY OF THE INVENTION

The present invention seeks to overcome or ameliorate at least one of the disadvantages associated with the prior art.

Embodiments of the invention provide a D.C. bus coupled between at least one fuel cell and an A.C. grid. Embodiments of the invention provide a D.C. auxiliary load, which may be a parasitic load of the at least one fuel cell, coupled to and powered from that D.C. bus.

In embodiments of the invention, a D.C. to D.C. converter is provided between the at least one fuel cell and the D.C. bus. This may transform the voltage generated by the at least one fuel cell to the voltage to be carried on the D.C. bus. In embodiments, the D.C. to D.C. converter steps the voltage up from the unregulated voltage output by the at least one fuel cell to a regulated voltage carried on the D.C. bus, which is higher than the output voltage of the at least one fuel cell. The D.C. to D.C. converter may be a high frequency transformer, for example with a frequency between 20 KHz and 100 KHz. Different types of DC/DC converter may be used, including but not limited to half bridge, full bridge or push-pull. In one embodiment, a full bridge with an isolation transformer is used.

In embodiments of the invention, the D.C. bus is voltage regulated. In embodiments of the invention, a bidirectional inverter is provided between the D.C. bus and the A.C. grid. In embodiments of the invention, the bidirectional inverter can control the voltage on the D.C. bus, and can provide the voltage regulation. In embodiments of the invention the bidirectional inverter is arranged to regulate the voltage on the D.C. bus when the system is connected to the A.C. grid, and may do so.

In embodiments of the invention, the D.C. auxiliary load is a parasitic load of the at least one fuel cell, i.e. a load that is required for the at least one fuel cell to operate. In embodiments of the invention, the D.C. auxiliary load includes a blower for the at least one fuel cell. In embodiments, the auxiliary load includes a fuel pump for the at least one fuel cell.

In embodiments of the invention, the system includes a voltage regulated D.C. bus connected between a D.C. to D.C. converter and a bi-directional inverter, the bi-directional inverter also being connected to an A.C. grid, and the D.C. to D.C. converter also being connected to at least one fuel cell, wherein at least one D.C. auxiliary load of the at least one fuel cell is connected to the voltage regulated D.C. bus. The system can therefore be made significantly smaller, and lighter, at the expense of a slight loss of efficiency.

By providing D.C. auxiliary load(s) of the at least one fuel cell on the D.C. bus, transformation of the at least one fuel cell generated current from D.C. to mains A.C. and back to D.C. to power the auxiliary loads is avoided. In this way, a single conversion stage only is required to provide the power to the D.C. load, whether it be from the at least one fuel cell, or from the A.C. grid.

Further, if the D.C. auxiliary loads were powered from the unregulated output from the at least one fuel cell, rather than from the D.C. bus, during start-up when the fuel cell is not generating any power, the system must be run in reverse to power the loads connected to the fuel cell. In this case, a contactor would be needed to avoid applying a voltage to the fuel cell, which is not desirable. Such contactors are generally large, expensive and noisy.

D.C. loads placed on an unregulated D.C. power system are generally designed for a particular range of DC voltages (for example 40-60V) to cope with the operating condition of the fuel cell(s). However, this means that if a slightly higher power unit is produced, for example with more layers, or a unit with the same power output but a different ratio of voltage and current, a redesign of the DC load(s) would be required.

Further, in order to have the unregulated D.C. voltage power the parasitic devices, with power from the A.C. grid, the DC/DC stage must be bi-directional. This adds significant cost and complexity to the system. In embodiments of the present invention, a unidirectional D.C. to D.C. converter may be used.

In embodiments of the invention, the voltage regulation on the D.C. bus is based on average voltage, rather than controlling the voltage to be exactly constant. In an embodiment for use where the A.C. grid has a frequency of 50 Hz, superimposed on the regulated voltage is a 100 Hz ripple current of the order of 10V. This is provided because single phase power is always actually delivered at 100 Hz; the D.C. bus is used to filter this out so that what is drawn from the fuel cell is pure DC.

In embodiments of the invention, at least one A.C. auxiliary load is connected on the A.C. grid side of the bidirectional inverter. The A.C. auxiliary load may be an auxiliary load of the fuel cell stack.

In embodiments of the invention, an electrical energy storage device is connected to the D.C. bus. The storage device may be connected to the D.C. bus by a controllable D.C.:D.C. converter. More than one such storage device may be provided, as required.

In an embodiment of the invention, a second voltage regulated D.C. bus may be provided externally of the system for connecting a fuel cell stack to an A.C. grid. The external D.C. bus may be connected to the voltage regulated D.C. bus of the system. One or more storage devices may be connected to this further D.C. bus via one or more D.C.:D.C. converters. Further, the D.C. bus may have a further fuel cell system connected thereto. The further fuel cell system may be different from the fuel cell stack described above. In embodiments of the invention both an internal and external storage device are provided. In embodiments of the invention, multiple storage devices and/or fuel cell stacks can be provided external to the system.

The storage device may be any one or more of one or more batteries, capacitors, flywheels or other such energy storage devices.

In operation, in embodiments of the invention, the system can operate in different modes. In a first mode, voltage regulated D.C. power may be provided to at least one D.C. auxiliary load of at least one fuel cell from an A.C. grid, via a voltage regulated D.C. bus. In a second mode, voltage regulated D.C. power may be provided to the at least one D.C. auxiliary load from at least one fuel cell, via the voltage regulated D.C. bus. In embodiments of the invention, in a first sub-mode of the first mode, power is provided to the at least one DC auxiliary load from the A.C. grid only. In embodiments of the invention, in a second sub-mode of the first mode, power is provided to the at least one DC auxiliary load from both the A.C. grid and the at least one fuel cell. The first sub-mode of the first mode may occur when the at least one fuel cell is not producing any power. The second sub-mode of the first mode may occur when the at least one fuel cell is producing less power than the at least one D.C. auxiliary load draws. When the system is in the second mode, power may be provided to the A.C. grid from the at least one fuel cell. The second mode may occur when the at least one fuel cell is producing more power than the at least one D.C. auxiliary load draws. The system may also operate in a third mode in which the fuel cell power generation system is isolated from the A.C. grid and the D.C. bus voltage is regulated by the D.C. to D.C. converter. The D.C. bus voltage may be regulated between 300 and 500 volts D.C. The D.C. bus voltage may be regulated to around 400 volts D.C. The start-up of the system may also be powered from one or more storage devices, if provided. In this mode, power may be provided to the at least one D.C. auxiliary load from the one or more storage devices, rather than from the A.C. grid, during start-up of the fuel cell stack.

Therefore, according to a first aspect of the invention, there is provided a system for connecting a fuel cell stack to an A.C. grid for providing power thereto according to claim 1. According to a second aspect of the present invention, there is provided a method according to claim 14.

BRIEF DESCRIPTION OF THE DRAWINGS

Embodiments of the invention will now be described, purely by way of example, with reference to the accompanying drawings, in which.

DETAILED DESCRIPTION OF EMBODIMENTS OF THE INVENTION

Figure 1A:
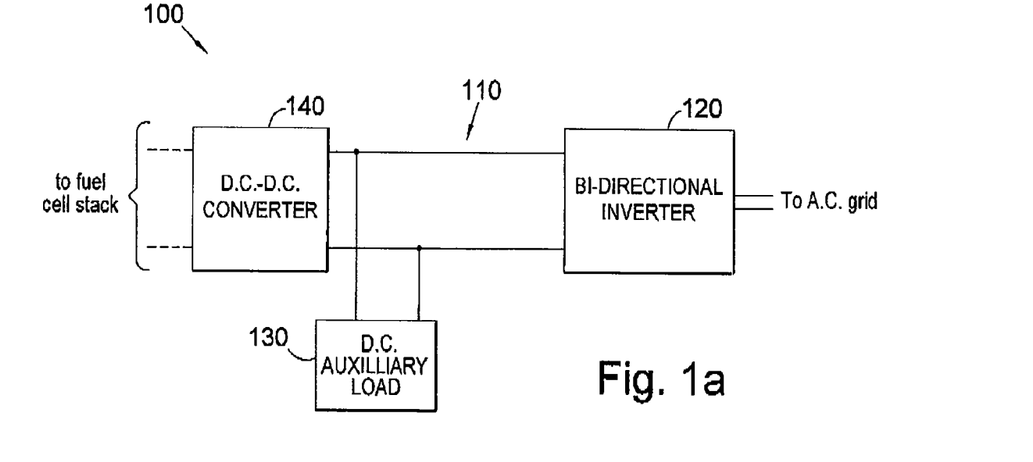
FIG. 1*a* shows a schematic control system according to a first embodiment of the invention.

FIG. 1*a* shows a schematic diagram of a system according to an embodiment of the invention. The system 100 includes a voltage regulated D.C. bus 110 to be coupled to a fuel cell stack (which may comprise one or more fuel cells), a bidirectional inverter 120 connected to the D.C. bus 110, and to be connected between the D.C. bus 110 and an A.C. grid, and at least one D.C. auxiliary load 130 of the fuel cell stack coupled to the D.C. bus 110. A D.C. to D.C. booster converter 140 is provided between the fuel cell stack and the D.C. bus. The D.C. to D.C. converter 140 isolates the fuel cell stack from the D.C. bus and steps the unregulated voltage from the fuel cell stack to a regulated voltage on the D.C. bus. Although a single D.C. auxiliary load 130 is shown herein, it will be appreciated that further auxiliary loads could be connected to the D.C. bus 110.

The D.C. auxiliary load 130 draws power from the D.C. bus 110. Depending on the operation of the system 100, the power for the auxiliary load 130 can be provided to the D.C. bus to be drawn by the D.C. auxiliary load 130 from the fuel cell stack, the A.C. grid, or a combination of both of these. The bidirectional converter 120 regulates the voltage on the D.C. bus 110. In the present embodiment, the voltage regulation on the D.C. bus is based on average voltage, rather than controlling the voltage to be exactly constant. Superimposed on the regulated voltage is a 100 Hz ripple current of the order of 10V. This is provided because single phase power is actually delivered at 100 Hz; the D.C. bus is used to filter this out so that what is drawn from the fuel cell is pure D.C.

Figure 1B:
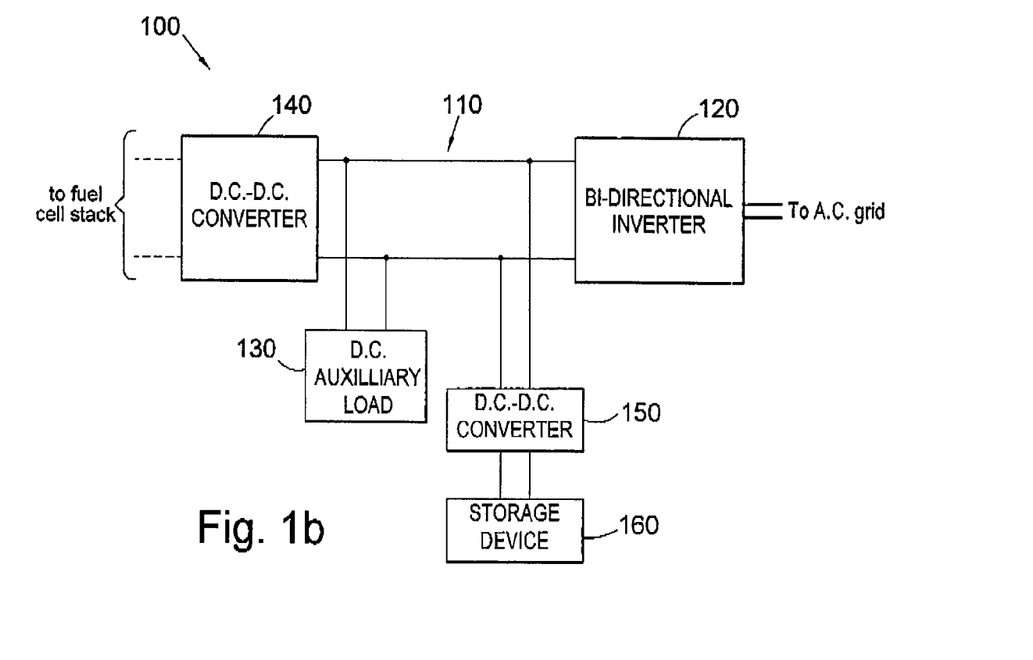
FIG. 1*b* shows a schematic control system according to a variation of the first embodiment.

FIG. 1*b* shows a variation of the control system according to the first embodiment. In this variation, like components are referred to with like reference numerals. In this variation, which otherwise corresponds to that discussed above in relation to FIG. 1a, a further D.C.:D.C. converter 150 is provided, which is connected to the voltage regulated D.C. bus 110. An electrical energy storage device 160 is connected to the D.C. bus 110 via the further D.C.:D.C. converter 150. In the present embodiment, the storage device is a battery system. However, other storage devices could include capacitors, flywheels or others as would be known to one skilled in the art.

Figure 2A:
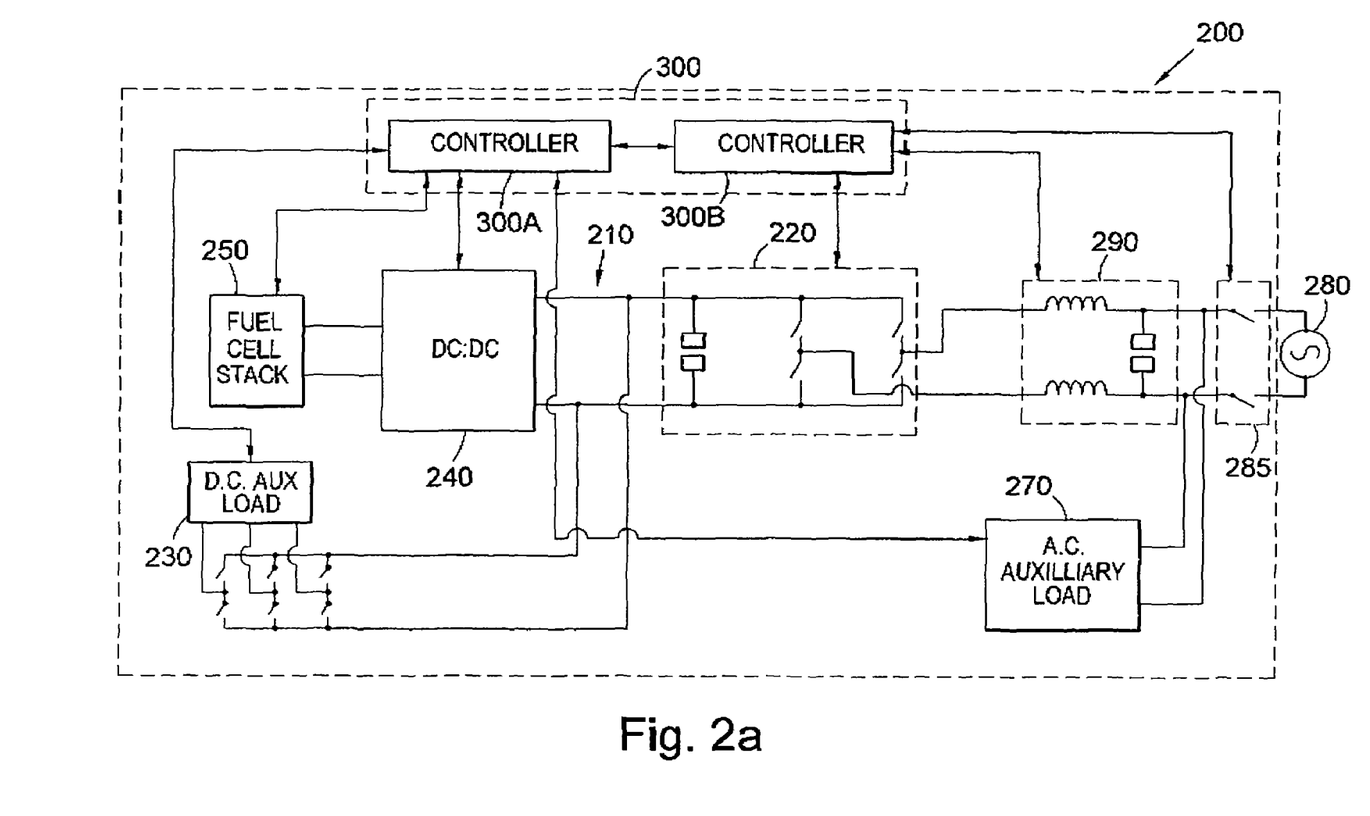
FIG. 2*a* shows a schematic control system according to a second embodiment of the invention.

FIG. 2a shows a second embodiment of the invention. The second embodiment is similar to the first embodiment, and shares the features shown in the first embodiment. Therefore, a D.C. bus 210 is provided, which is voltage regulated by a bidirectional inverter 220. In the present embodiment, the bidirectional inverter 220 is shown in a simplified manner and comprises an A.C. to D.C. converter. A D.C. auxiliary load 230 is connected to the D.C. bus 210. Further, as in the first embodiment, it will be appreciated that further, additional, auxiliary loads may also be connected to the D.C. bus 210. For example, a fuel pump, and/or other auxiliary loads could also be provided on the D.C. bus.

A D.C. to D.C. converter 240 is provided between a fuel cell stack 250 (which may comprise one or more fuel cells) and the D.C. bus 210, which couples the fuel cell stack 250 to the D.C. bus 210. The D.C. to D.C. converter 240 is unidirectional, i.e. only allowing power to flow from the fuel cell stack 250 to the D.C. bus 210, without allowing power from the D.C. bus 210 back to the fuel cell stack 250. Suitable fuel cell stacks of the present embodiment are operable to produce a power output of up to around 10 KW. The fuel cell stack voltage is variable depending on factors discussed below in relation to the operation of the system.

In this embodiment, the D.C. auxiliary load 230 is a D.C. brushless motor, which is shown as a three-phase motor, and which may, for example, be a blower for the fuel cell stack 250. Further or alternate D.C. auxiliary loads may be provided. An A.C. auxiliary load 270 is also provided, which, although not shown as such in the present embodiment, may also be a parasitic load of the fuel cell stack 250. Further A.C. auxiliary loads may also be provided. The A.C. auxiliary load 270 is coupled to an A.C. grid 280.

A switch 285 is provided to isolate the system 200 from the A.C. grid 280. In the present embodiment, the A.C. auxiliary load 270 is isolated from the A.C. grid 280 when the switch 285 is open; the A.C. auxiliary load 270 is not on the A.C. grid side of the isolation switch 285. Alternatively, the switch 285 may be rearranged (or a further switch provided) so that the A.C. auxiliary loads are not isolated from the A.C. grid when the switch is open, if desired. A filter 290 is provided between the A.C. grid 280 and the bidirectional inverter 220.

A controller 300 is provided, which controls the fuel cell stack 250, the D.C. to D.C. converter 240, the bidirectional inverter 220 and the filter 290. In an embodiment, the controller 300 is split into two distinct control elements 300A, 300B. The first element 300A controls the fuel cell stack 250, D.C. load(s) 230 and D.C. to D.C. controller 240, with an option to control the AC auxiliary load 270. The second element 300B controls the bidirectional inverter 220, and switch 285 etc. The two elements of the controller 300 may be separate, and be able to function independently, within the overall control of the system 200. The control elements 300A, 300B can communicate with each other.

Figure 2B:
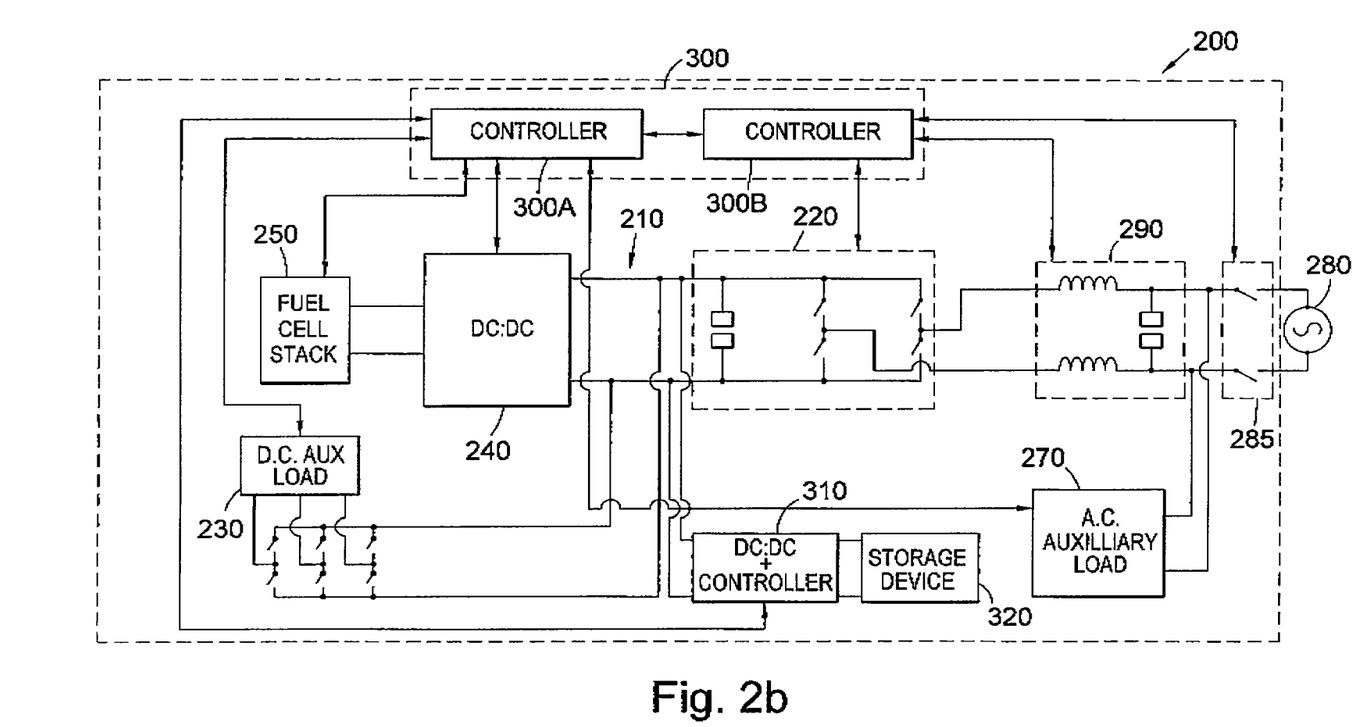
FIGS. 2*b* and 2*c* show variations of the second embodiment.
Figure 2C:
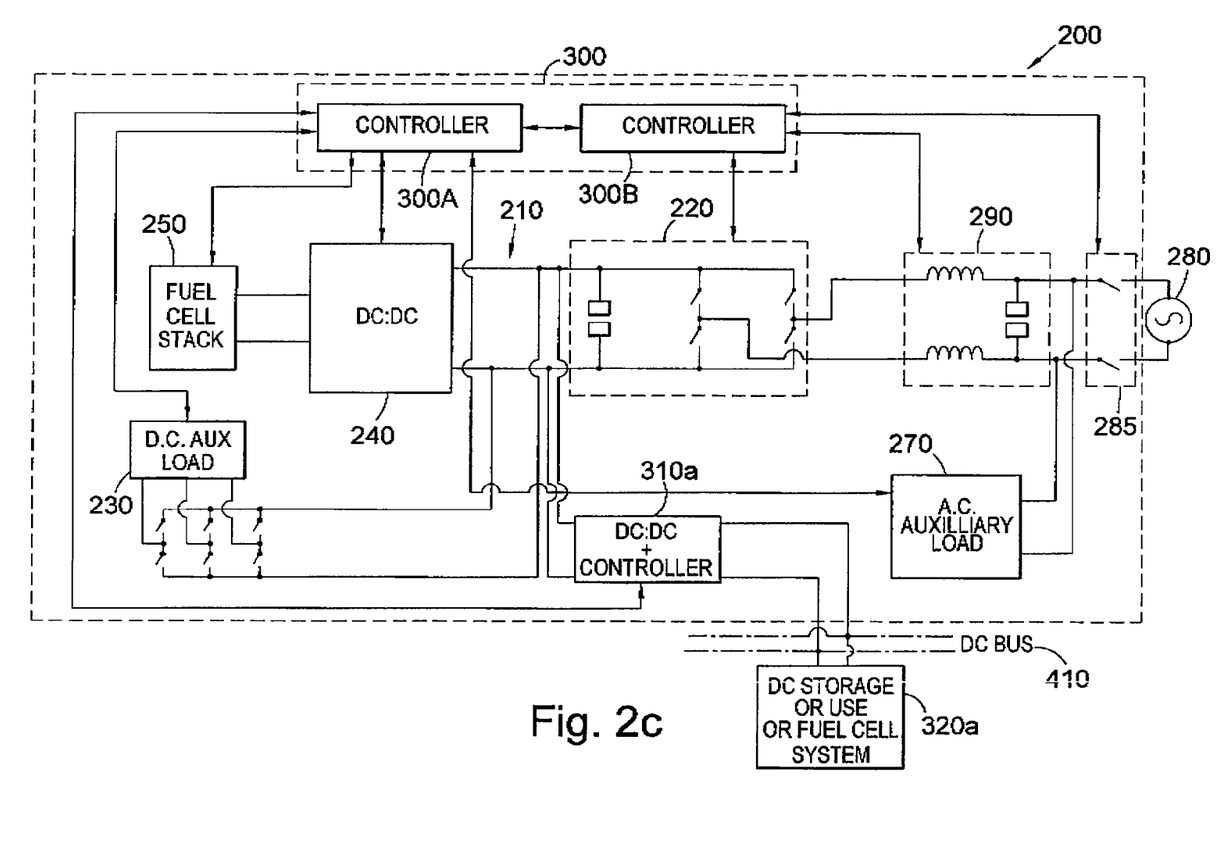

FIGS. 2b and 2c show two variations of the second embodiment. Like components between the figures are referred to by like reference numerals. The variation shown in FIG. 2b corresponds to that shown in FIG. 2a, with the exception that a D.C.: D.C. converter 310 is connected to the D.C. bus 210. An electrical energy storage device 320 is connected to the D.C. bus 210 via the D.C.:D.C. converter 310. The D.C.:D.C. converter 310 also includes a controller, to control the energy transfer between the storage device 320 and the D.C. bus 210. The controller in the D.C.:D.C. converter 310 is coupled to the controller 300.

FIG. 2c shows a variation on the second embodiment in which a D.C.:D.C. converter 310a is provided, coupled to the D.C. bus 210, and also coupled to a further D.C. bus 410, external to the system 200. One or more D.C. storage devices 320a are connected to the further D.C. bus 410. Additionally, or alternatively, one or more further fuel cell systems may be connected to the further D.C. bus 410.

Figure 3:
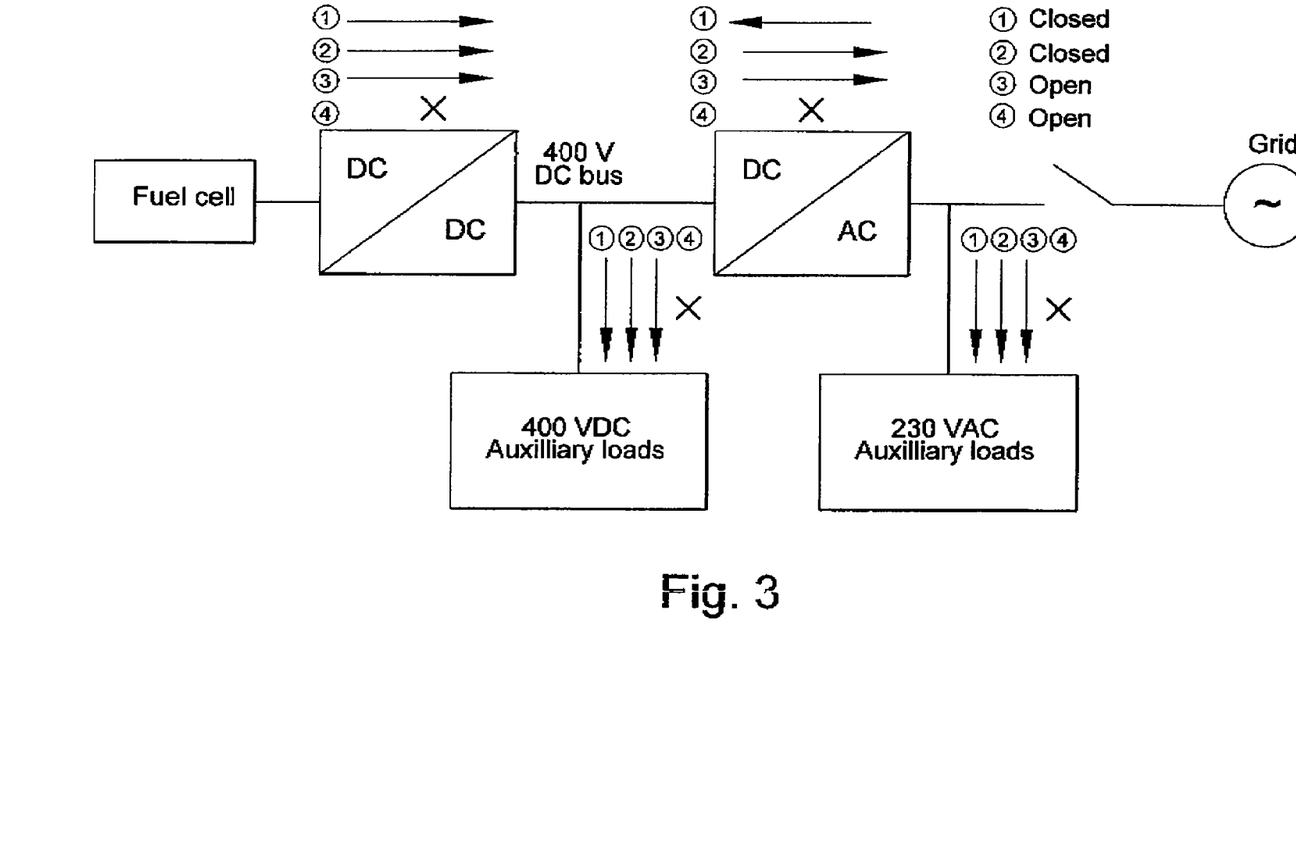
FIG. 3 shows a schematic diagram of the power flow in various modes of operation of the system of FIG. 2*a*.

FIG. 3 shows a schematic view of the power flow in a system according to FIG. 2a in different modes of operation. The arrows in the Figure show the direction of current flow in each mode. The discussion refers to elements of the system 200 shown in FIG. 2a by their reference numerals.

In a first mode, the current flow and operation of the system 200 of FIG. 2a are shown when the fuel cell stack 250 is producing less power than the D.C. auxiliary load(s) 230 require in order to operate. This situation would generally occur during, for example, start up or shut down of the fuel cell stack 250. In this case, any power generated by the fuel cell stack 250 (which may be none, if the stack is not operational in a first sub-mode of the first mode) is provided to the D.C. bus 210 via the D.C. to D.C. converter 240. The first element 300A of the controller 300 is the master and controls the current drawn, based on the start up/shut down requirements of the fuel cell. The D.C. to D.C. converter 240 is controlled by the first element 300A of the controller 300 to draw the required amount of current from the fuel cell stack 250 where it is supplying some power, in a second sub-mode of the first mode, and onto the D.C. bus 210 so ensuring that no D.C. power from the A.C. grid 280 is pumped into the fuel cell stack 250.

The remaining power required for the D.C. auxiliary loads 230 is provided to the D.C. bus 210 by the bidirectional inverter 220 from the A.C. grid 280. The bidirectional inverter 220 is controlled by the second element 300B of the controller 300 to regulate the D.C. bus 210 to, in the present embodiment, 400V, by varying the A.C. input current from the grid 280 (the system is in current control mode, with power factor correction, discussed further below, provided). The A.C. auxiliary load(s) 270 is powered from the A.C. grid 280 directly.

In a second mode, the current flow and operation of the system 200 of FIG. 2a are shown when the fuel cell stack 250 is producing more power than is required for the D.C. auxiliary loads 230. This situation would generally occur when the fuel cell stack 250 is in normal operation. In this case, the first element 300A of the controller 300 controls the fuel cell stack 250 to control what current the fuel cell stack 250 should produce, based on, for example, user demands, time of day, other expected surges in demand etc. The controller 300 regulates the fuel flow, airflow and other requirements accordingly. The D.C. to D.C. controller 240 is controlled to draw this much current from the fuel cell and on to the D.C. bus 210. In the second mode, the inverter is again in current control mode, the A.C. grid sets the voltage and frequency and the bidirectional inverter pushes current onto the A.C. grid in phase.

The bidirectional inverter 220 is controlled by the controller 300 to regulate the D.C. bus 210 to 400V by varying the A.C. output current. The system is configured so that it does not track the 2× mains frequency (100 Hz in the UK) oscillations that are present on the D.C. bus 210. Some of the power output from the bidirectional converter 220 is used to power the A.C. auxiliary loads 270, and the rest is output to the A.C. grid 280.

In a third mode, the system 200 of FIG. 2a is isolated from the grid by opening isolation switch 285. The system 200 now runs as a local island, disconnected from the A.C. grid 280. The bidirectional inverter 220 now runs in a voltage control mode, in which it is controlled by the controller 300 to generate a local 'grid' by defining the voltage and frequency, and provide power the A.C. auxiliary load 270. The D.C. to D.C. converter 240 is now used to regulate the D.C. bus 210 to 400V, and controlled to provide the correct power to run the D.C. auxiliary load 230. The first element 300A of the controller 300 is now a slave and reacts to the D.C. to D.C. current by varying the fuel flow, air flow and other system parameters accordingly.

In a fourth mode, the system is off. In this mode, the D.C. and A.C. loads 230, 270 are off. No power is drawn from the fuel cell stack 250. The D.C. bus 210 is unregulated, the inverter 220 is off and auxiliary power supplies (not shown) are active and the controller 300 is powered.

In general, the system is configured so that the lowest point of the oscillation on the voltage regulated bus is greater than the peak of the mains A.C. voltage. This peak may be a defined set-point, or it may be monitored and the voltage regulated to ensure that the regulated voltage is not greater than an instantaneous peak of the mains voltage.

Figure 4:
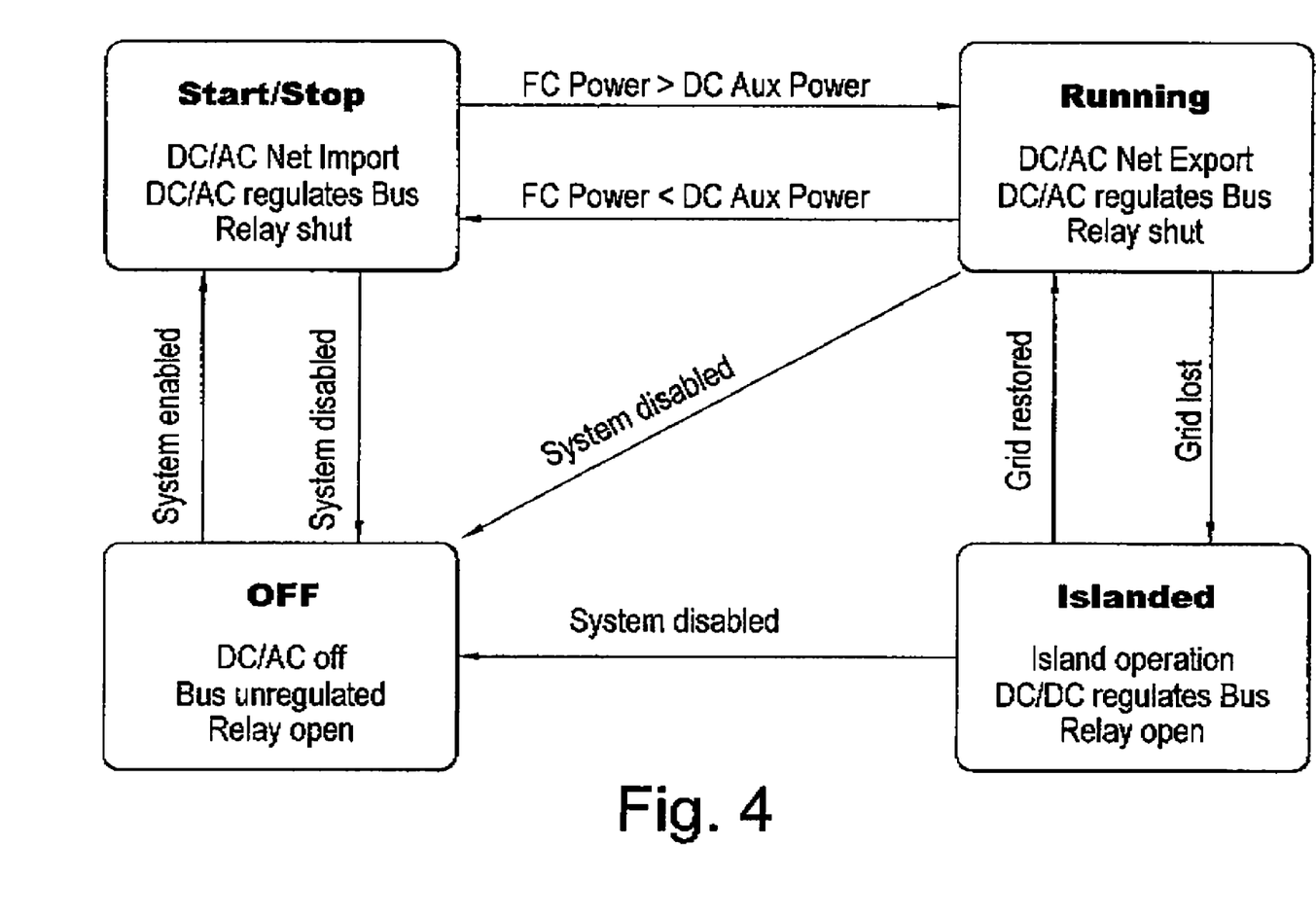
FIG. 4 shows a schematic diagram of the changeover criteria between different modes of operation of the system of FIGS. 2*a* and 3.

FIG. 4 shows a schematic diagram of the changeover criteria between different modes of operation of the system of FIGS. 2a and 3. When the system 200 is in the first mode and the power from the fuel cell stack 250 becomes greater than that drawn by the D.C. auxiliary load 230, for example during start up of the fuel cell stack 250, the system will switch to the second mode once the fuel cell stack 250 begins to supply more power than is required for the D.C. auxiliary loads 230. When the system 200 is in the second mode, and, for example, as occurs during shut down of the fuel cell stack 250, the power provided by the fuel cell stack 250 falls below that required by the D.C. auxiliary load 230, the system 200 switches to the first mode. In order to avoid the system 200 from 'chattering' between the first and second modes, the system includes some hysteresis to provide a lag between the detection of the change in power distribution and the switch between modes. 'Chatter' may also be avoided by, for example, only allowing one transition per mains cycle.

Further, if, when the system 200 is operating in the second mode, it is detected that the A.C. grid 280 has been lost and the system 200 is an island, the system 200 switches from the second mode to the third mode. Conversely, when the A.C. grid 280 is detected as being restored, the system 200 switches back from the third mode to the second mode.

The system can move to the fourth, off, mode from any other mode, as required. Now referring back to FIG. 2a, the components of the system 200 of FIG. 2a operate as follows. When the system 200 is operating in the second mode, the bidirectional inverter 220, which is provided as an A.C. to D.C converter, is controlled to deliver a sinusoidal current in phase with the mains voltage on the A.C. grid 280. The bidirectional inverter 220 forms this shape by varying the duty cycle of a pulse width modulated (PWM) signal. The filter 290 is provided to smooth the output from the bidirectional inverter 220 to take out the high frequency component of the PWM signal to leave the underlying sinusoid for output to the A.C. grid 280.

The instantaneous power being delivered to the A.C. grid 280 is the product of the voltage and current, both of which are alternating at mains frequency (50 Hz in the UK). The resulting power is therefore a $\sin^2$ wave, which is a sin wave at double the mains frequency, oscillating between zero and twice the mean power. The power, and hence the current drawn from the fuel cell stack 250, is pure D.C. i.e. it is not exposed to any A.C. frequency, whether the power or the current frequency. In order to achieve this simply, the D.C. to D.C. converter 240 is controlled as a current source, and pushes power smoothly out from the fuel cell stack 250 to the D.C. bus 210. The D.C. to D.C. converter steps the fuel cell stack 250 voltage to a higher voltage level which is higher than the peak of the voltage of the A.C. grid 280. As discussed above, this peak mains voltage may be determined in a number of ways. In the present embodiment, the D.C. to D.C. converter 240 operates by converting the D.C. from the fuel cell stack 250 to a high frequency A.C., passing it through a transformer to the new voltage and then rectifying it back to D.C. The D.C. to D.C. converter 240 therefore ensures that the voltage on the D.C. bus 210 is constant, even though the voltage from the fuel cell stack 250 varies and is therefore unregulated.

In order to achieve an energy balance at the D.C. bus 210, a capacitor bank or other such energy storage device or system is used (which may be positioned within the A.C. to D.C. converter 230), which sinks and sources the current onto the D.C. bus 210, therefore providing the twice mains frequency power output required at the output. The voltage on the D.C. bus will 210 vary at twice the mains voltages as power is sourced and sinked in the capacitors, typically between 390V and 410V. The average voltage on the D.C. bus 210 is maintained by balancing the power drawn from the fuel cell stack 250 to the mean power delivered to the A.C. grid 280.

In the present embodiment, the D.C. auxiliary load 230 is a brushless D.C. motor, which is wound for high voltage. By use of a system of an embodiment of the invention, it is possible to avoid use of a further transformer and further conversion steps to generate the low voltage typically used to supply brushless D.C. motors, commonly 24V or 48V, either from the high voltage D.C. or the A.C., which reduces power conversion losses as well as component numbers, cost and size of the system 200, and increases efficiency.

When the system 200 is operating in the first mode, at least some of the power for the D.C. auxiliary loads 230 must come from the A.C. grid 280. If this were done by providing a bridge rectifier to convert the mains to D.C. and a smoothing capacitor, a distorted current waveform would be pulled from the A.C. grid 280, which would require an active circuit to correct this. Such a circuit might use a voltage booster between the output of the bridge rectifier and the smoothing capacitor to actively shape the input current drawn to be sinusoidal. Such additional circuitry increases the size and cost of a system. In the present embodiment, the inverter 220 and filter 290 can be used in reverse. In the first mode, the switches of the inverter 220 are controlled so that the current drawn from the A.C. grid 280 is a sinusoid, and provides active power factor correction to the D.C. auxiliary load 230, which prevents the inverter 220 from inducing harmonics back onto the A.C. grid 280. The inductors within the filter 290 (which in the second mode smooth the output to remove the PWM signal) are now used in conjunction with the switches in the inverter 220 to provide a voltage boost. Once again, the capacitor bank in the inverter 220 sinks and sources the twice A.C. grid frequency component of the power. The D.C. auxiliary load 230 can therefore operate as normal from the D.C. bus 210. The D.C. auxiliary load 230 is therefore 'blind' to whether the system 200 is operating in the first or second mode i.e. whether D.C. bus is receiving power from the fuel cell stack 250, the A.C. grid 280, or a combination of both.

In the systems shown in FIGS. 2b and 2c, the electrical energy storage device may be used instead of or in conjunction with the A.C. grid during power-up and power-down of the fuel cell stack.

Embodiments of the present invention have been described herein in a non-limiting form, by way of example, and it will be appreciated that many alternatives, omissions, substitutions and additions will present themselves to one skilled in the art, such alternatives, omissions, substitutions and additions being within the spirit and scope of the invention. It will be appreciated that embodiments of the invention may be used and incorporated in distributed power generation applications, micro-power generation, small-scale energy generation or larger applications, such as power plants or power stations. Further, as discussed above, the A.C. grid may be a national or regional power grid, or may be a local grid, or may be a generator or stand-alone inverter connected to a D.C. source, i.e. any system which carries A.C.

Unless the context clearly requires otherwise, the words "comprise", "comprising" and the like, are used herein an inclusive, rather than exclusive or exhaustive way, that is in the form of "including, but not limited to".

The invention claimed is:

1. A system for connecting a fuel cell stack to an A.C. grid to provide power thereto, comprising:
   a D.C. to D.C. converter to be coupled to the fuel cell stack;
   a voltage regulated D.C. bus coupled to the D.C. to D.C. converter;
   a bidirectional inverter coupled to the D.C. bus, and to be coupled between the D.C. bus and the A.C. grid; and
   at least one D.C. auxiliary load of the fuel cell stack coupled to the D.C. bus,
   wherein the at least one D.C. auxiliary load of the fuel cell stack includes a load that is required for the fuel cell stack to operate,
   wherein the D.C. to D.C. converter is unidirectional in order to provide power from the fuel cell stack to the D.C. bus, and
   wherein the D.C. bus extends continuously from the D.C. to D.C. converter to the bidirectional inverter without interruption by a D.C. isolator in the D.C. bus.

2. A system according to claim 1, wherein the bidirectional inverter comprises an A.C. to D.C. converter.

3. A system according to claim 1, wherein the bidirectional inverter is arranged to regulate the voltage on the D.C. bus.

4. A system according to claim 1, wherein the bidirectional inverter is arranged to regulate the voltage on the D.C. bus when the system is connected to the A.C. grid.

5. A system according to claim 1, wherein the D.C. to D.C. converter is arranged to regulate the voltage on the D.C. bus.

6. A system according to claim 5, wherein the D.C. to D.C. converter is arranged to regulate the voltage on the D.C. bus when the system is not connected to the A.C. grid.

7. A system according to claim 1, further comprising at least one A.C. auxiliary load connected on the A.C. grid side of the bidirectional inverter.

8. A system according to claim 7, wherein the A.C. auxiliary load is an auxiliary load of the fuel cell stack.

9. A system according to claim 1, wherein the system is arranged to provide D.C. power to the at least one D.C. auxiliary load, via the D.C. bus, at least partially from the A.C. grid when the fuel cell stack is not providing sufficient power for the at least one D.C. auxiliary load.

10. A system according to claim 9, wherein the bidirectional inverter is adapted to provide active power factor correction to the D.C. auxiliary load when the D.C. auxiliary load is powered at least partially from the A.C. grid.

11. A system according to claim 1, wherein the system is arranged to provide power to the at least one D.C. auxiliary load, via the D.C. bus, from the fuel cell stack when the fuel cell stack is providing sufficient power for the at least one D.C. auxiliary load.

12. A system according to claim 1, further comprising at least one electrical energy storage device coupled to the D.C. bus.

13. A system according to claim 12, further comprising a further D.C. to D.C. converter, coupled between the D.C. bus and the electrical energy storage device.

14. A system according to claim 1, wherein a switch is provided that can be opened to isolate the system from the A.C. grid.

15. A system according to claim 14, wherein an A.C. auxiliary load is provided between the switch and the bidirectional inverter.

16. A method for controlling a power generation system including a fuel cell stack supplying an A.C. grid, the method comprising providing power to a voltage regulated D.C. bus, and at least one D.C. auxiliary load of the fuel cell stack connected to the D.C. bus, wherein:
   the at least one D.C. auxiliary load of the fuel cell stack includes a load that is required for the fuel cell stack to operate,
   in a first mode, voltage regulated D.C. power is provided to the at least one D.C. auxiliary load from the A.C. grid, via the voltage regulated D.C. bus; and
   in a second mode, voltage regulated D.C. power is provided to the at least one D.C. auxiliary load from the fuel cell stack, via the voltage regulated D.C. bus,
   wherein a unidirectional D.C. to D.C. converter is provided between the fuel cell stack and the D.C. bus in order to provide power from the fuel cell stack to the D.C. bus, and
   wherein the D.C. bus is provided so as to extend continuously from the D.C. to D.C. converter to a bidirectional inverter without interruption by a D.C. isolator in the D.C. bus.

17. A method according to claim 16, wherein, in a first sub-mode of the first mode, power is provided to the at least one D.C. auxiliary load from the A.C. grid only.

18. A method according to claim 17, wherein, in a second sub-mode of the first mode, power is provided to the at least one D.C. auxiliary load from both the A.C. grid and fuel cell stack.

19. A method according to claim 18, wherein the second sub-mode of the first mode occurs when the fuel cell stack is producing less power than the at least one D.C. auxiliary load draws.

20. A method according to claim 17, wherein the first sub-mode of the first mode occurs when the fuel cell stack is not producing any power.

21. A method according to claim 16, wherein, in the first mode, the D.C. bus voltage is regulated by an A.C. to D.C. converter between the A.C. grid and the D.C. bus.

22. A method according to claim 16, wherein, in the second mode, the D.C. bus voltage is regulated by an A.C. to D.C. converter between the A.C. grid and the D.C. bus.

23. A method according to claim 16, wherein, in the second mode, power is provided to the A.C. grid from the fuel cell stack.

24. A method according to claim 16, wherein the second mode occurs when the fuel cell stack is producing more power than the at least one D.C. auxiliary load draws.

25. A method according to claim 16, further comprising a third mode in which the power generation system is isolated from the A.C. grid and the D.C. bus voltage is regulated by the D.C. to D.C. converter.

26. A method according to claim 25, wherein, in the third mode, a local A.C. grid is provided by an A.C. to D.C. converter between the local A.C. grid and the D.C. bus.

27. A method according to claim 16, further comprising a fourth mode in which no power is drawn from the fuel cell stack, no auxiliary loads are powered and power is provided to a system controller.

28. A method according to claim 27, wherein, in the fourth mode, power is also provided to at least one system A.C. auxiliary load.

29. A method according to claim 16, wherein the D.C. bus voltage is between 300 and 500 volts D.C.

30. A method according to claim 29, wherein the D.C. bus voltage is around 400 volts D.C.

31. A method according to claim 16, wherein a switch is provided that can be opened to isolate the system from the A.C. grid.

32. A method according to claim 31, wherein an A.C. auxiliary load is connected between the switch and the system.

33. A power generating device, comprising a system for connecting a fuel cell stack to an A.C. grid to provide power thereto, the system comprising:
a D.C. to D.C. converter to be coupled to the fuel cell stack;
a voltage regulated D.C. bus coupled to the D.C. to D.C. converter;
a bidirectional inverter coupled to the D.C. bus, and to be coupled between the D.C. bus and the A.C. grid; and
at least one D.C. auxiliary load of the fuel cell stack coupled to the D.C. bus,
wherein the at least one D.C. auxiliary load of the fuel cell stack includes a load that is required for the fuel cell stack to operate, wherein the D.C. to D.C. converter is unidirectional in order to provide power from the fuel cell stack to the D.C. bus, and
wherein the D.C. bus extends continuously from the D.C. to D.C. converter to the bidirectional inverter without interruption by a D.C. isolator in the D.C. bus.

34. A power generating device according to claim 33, the device being configured to produce useable heat.

35. A power generating device according to claim 33, wherein a switch is provided that can be opened to isolate the system from the A.C. grid.

36. A power generating device according to claim 35, wherein an A.C. auxiliary load is provided between the switch and the bidirectional inverter.

* * * * *